Feb. 17, 1970 T. W. MILES 3,495,524
VERTICAL BARBECUE UNIT
Filed July 23, 1968 2 Sheets-Sheet 1

INVENTOR
THOMAS WAYNE MILES

By Robert C. Comstock
ATTORNEY.

Feb. 17, 1970 — T. W. MILES — 3,495,524
VERTICAL BARBECUE UNIT
Filed July 23, 1968 — 2 Sheets-Sheet 2

INVENTOR.
THOMAS WAYNE MILES
BY Robert C. Comstock
ATTORNEY.

United States Patent Office 3,495,524
Patented Feb. 17, 1970

3,495,524
VERTICAL BARBECUE UNIT
Thomas Wayne Miles, Los Angeles, Calif.
(6331 Hollywood Blvd., Hollywood, Calif. 90028)
Filed July 23, 1968, Ser. No. 746,792
Int. Cl. A47j 37/04
U.S. Cl. 99—399
8 Claims

ABSTRACT OF THE DISCLOSURE

A portable vertical barbecue unit having a vertically directed heat source surrounded on both sides with chunks of heat refractory material such as pumice. A pair of removable vertical heat holding racks are disposed on opposite sides of the heat source. Parallel inwardly inclined guide means force the meat holding racks into engagement with the heating area to provide contact cooking without flare-up. Removable grease trays are provided beneath the racks to catch and hold grease dripping from the meat.

BACKGROUND OF THE INVENTION

Field of the invention

The invention relates to a portable vertical barbecue unit.

Description of the prior art

Most of the prior art barbecue units are horizontal, rather than vertical. In such units grease drips from the meat onto the heat source. The grease is highly inflammable and causes flames which burn the meat, cause an undesirable amount of smoke and present a safety hazard.

SUMMARY OF THE INVENTION

The invention relates to a portable vertical barbecue unit. The unit includes a pair of removably mounted meat holding racks which are accurately and equally spaced from the source of the heat. The source of heat is surrounded on both sides by chunks of heat refractory material, such as pumice. Removable grease trays are disposed beneath the racks to catch the grease.

It is among the objects of the invention to provide a portable vertical barbecue unit which is superior to previous known and used devices. With this invention, all of the grease from the meat falls directly downwardly into grease collecting trays. It does not engage the heat source or heat refractory material, so that no flaming occurs to burn the meat or cause excessive smoke or present a fire hazard.

It is a particular object of the invention to provide a barbecue unit which may be used inside a home or apartment because the undesirable flames, smoke and fire danger customarily involved with barbecuing have been substantially eliminated.

Another object of the invention is to provide a barbecue unit in which the meat is accurately and equally spaced from the heat source, regardless of the thickness of the meat, so that uniformity of cooking can be achieved.

A further object of the invention is to provide a vertical barbecue unit in which a plurality of parallel inwardly inclined guide means force the meat holding racks into engagement with the heating area to provide contact cooking without flare-up.

It is accordingly among the objects of the invention to provide a portable barbecue unit having all of the advantages and benefits set forth above and described hereinafter in this specification. The invention also comprises such other objects, advantages and capabilities as will later more fully appear and which are inherently possessed by the invention.

While there has been shown in the drawings a preferred embodiment of the invention, it should be understood that the same is susceptible of modification and change without departing from the spirit of the invention.

DESCRIPTION OF THE PREFERRED EMBODIMENT

Figure 1:
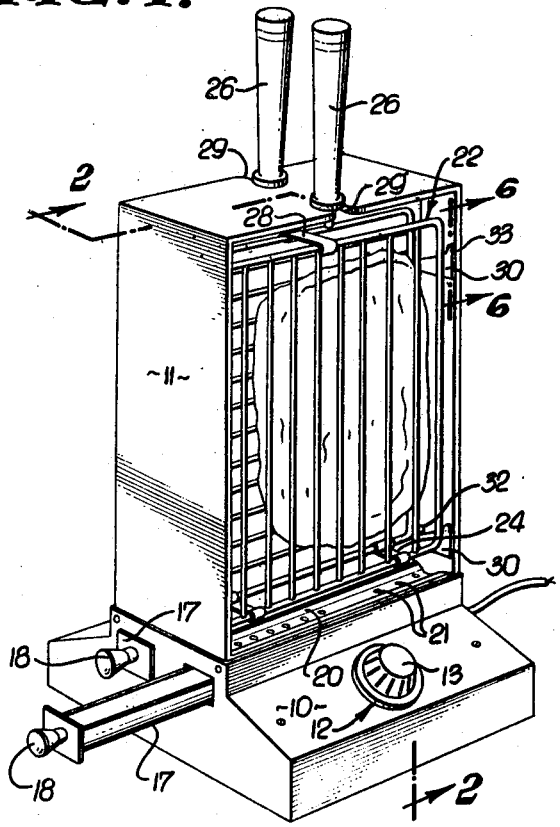
FIG. 1 is an isometric view of my portable vertical barbecue unit in use, with one of the grease trays partially removed.
Figure 2:
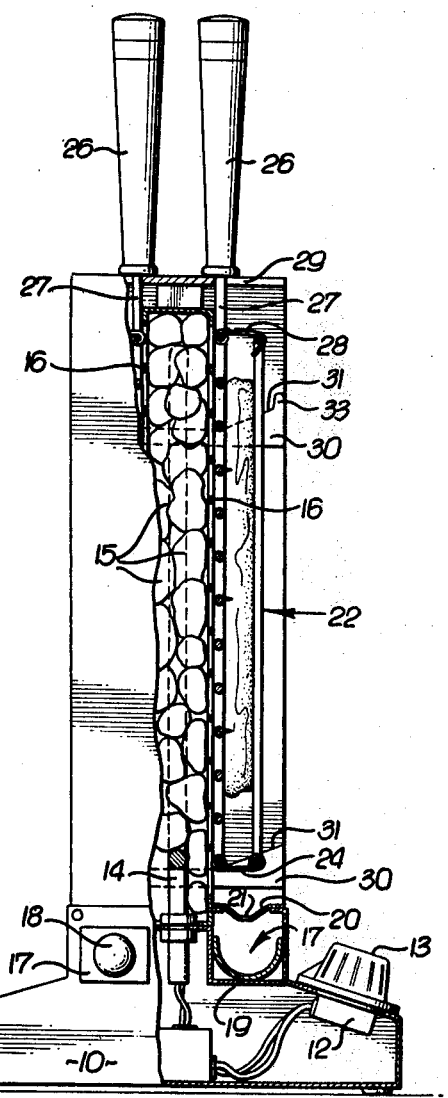
FIG. 2 is an end view of the same, partially in section along line 2—2 of FIG. 1.
Figure 6:
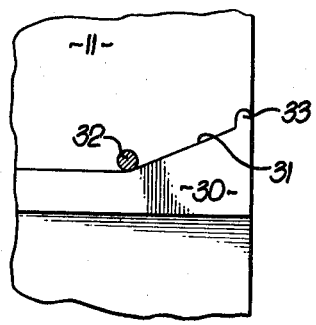
FIG. 6 is an enlarged sectional view taken on line 6—6 of FIG. 1.
Figure 4:
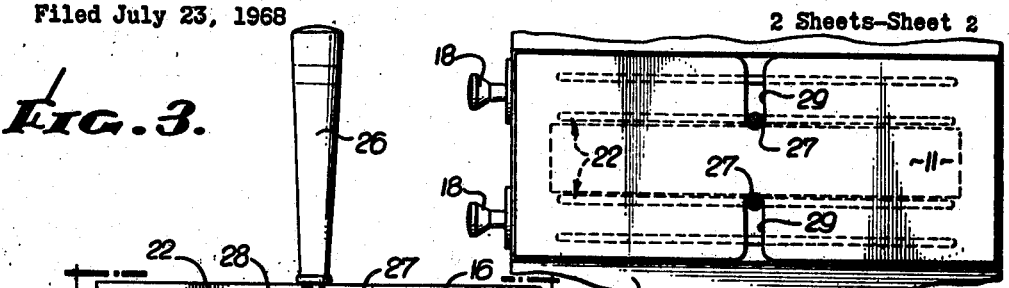
FIG. 4 is a partial top plan view taken along line 4—4 of FIG. 3.
Figure 3:
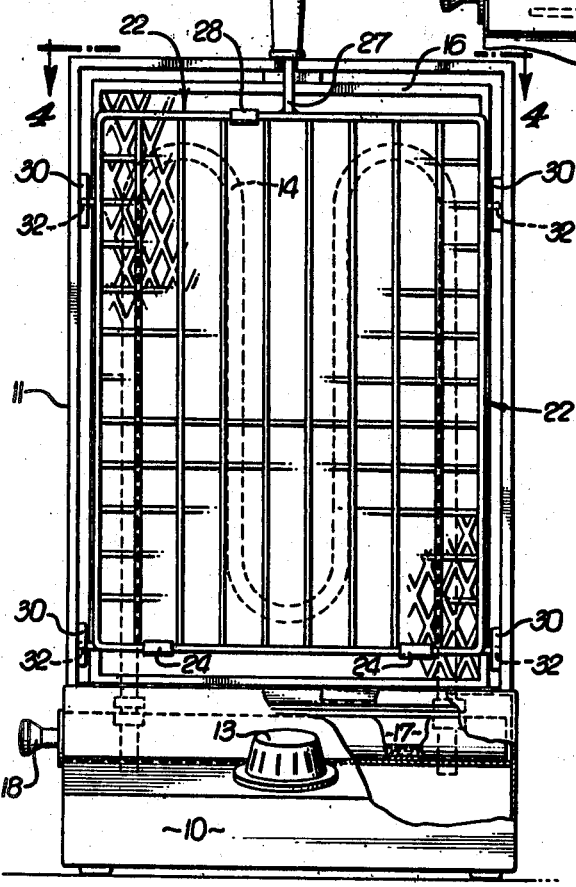
FIG. 3 is a transverse sectional view of the barbecue unit without any meat in the racks.

A preferred embodiment which has been selected to illustrate the invention is electrically operated, but it should be understood that the source of heat used might equally well be gas or any other source of heat, with appropriate modifications in the structure which would be obvious to those skilled in the art.

The unit comprises a base 10, which carries a heat control member 12 which is operated by manual rotation of a control knob 13 to control the amount of electricity which is applied to the heating element from a source of electrical supply. The heat control member 12 and control knob 13 are not essential and may be omitted.

Extending vertically upwardly from the base 10 is an upright portion 11, which encloses a vertically directed heating element 14 of the Calrod or other suitable type. The heating element 14 is shown as serpentine in contour and is disposed adjacent the axis of the upright portion 11.

Surrounding the heating element 14 on both sides are a plurality of chunks of pumice 15 or other suitable heat refractory material. In use, the pumice 15 absorbs and spreads the heat from the heating element 14, in order to provide even heat across both sides of the unit. The pumice 15 is held in place by a pair of expanded metal grates 16, which are disposed on opposite sides of the heating element 14 and which extend parallel thereto.

Slidably mounted in the base 10 are a pair of elongated removable grease trays 17. The grease trays 17 extend into the base 10 from one end thereof and are slidably removed and inserted by means of knobs 18. The grease trays 17 extend across the entire width of the base 10. The interior of each of the grease trays 17 is preferably provided with a rounded portion 19, which is easy to clean.

Directly above each of the grease trays 17 is a broadly V-shaped catch basin 20, which is provided at its lowest point with a plurality of spaced openings 21. When the unit is in use, grease drops from the meat into the catch basins 20 and flows through the openings 21 into the grease trays 17.

Figure 5:
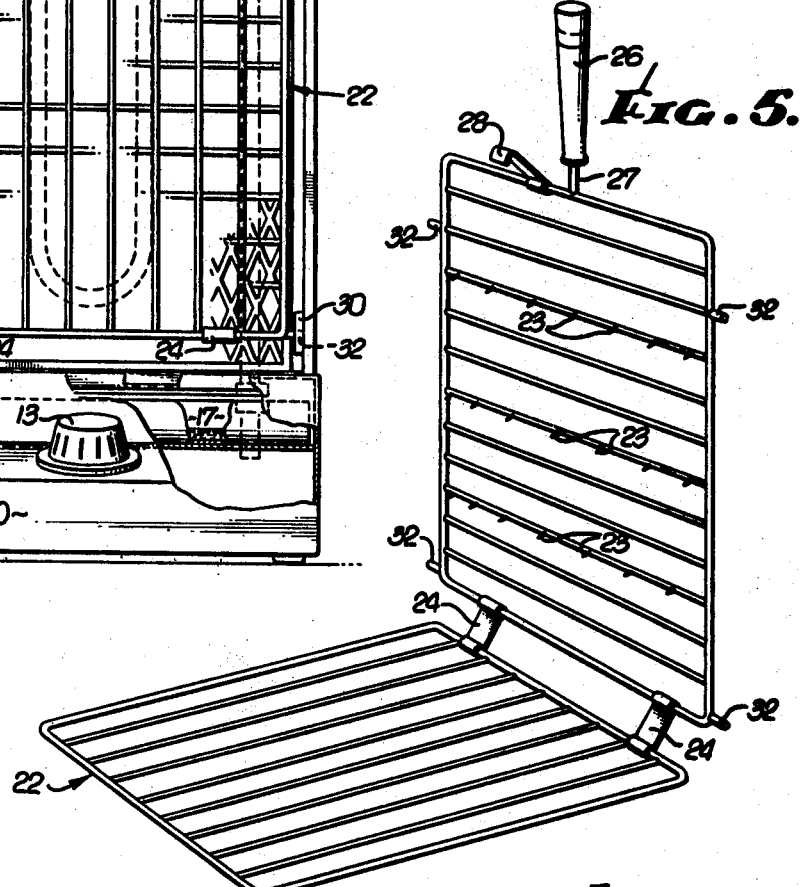
FIG. 5 is an isometric view of one of the meat racks in open position.

Meat which is cooked by the unit is held by either or both of a pair of removably mounted vertically extending meat racks 22, which are shown in FIG. 5 of the drawings. The meat racks 22 are preferably formed of a plurality of spaced wires, which may have any suitable configuration. The wires on one side of the rack 22 are preferably provided with a plurality of prongs 23 or similar members which are adapted to be inserted into the meat to hold it in a vertical position while it is being cooked.

The two sides of the rack 22 are pivotally secured together at the bottom by a pair of spaced links 24, which permit the sides of the rack 22 to adjust automatically in their spacing according to the thickness of the meat which is held between them. The upper end of one side of the rack carries a link catch 28, which engages the upper portion of the opposite side of the rack to hold the rack in closed position.

A handle 26 extends vertically upwardly from the upper end of one side of the rack 22. The handle 26 is connected to the rack 22 by a short rod 27.

The top of the upright portion 11 is provided adjacent its midportion with a pair of inwardly directed slots 29, which are adapted to removably receive the rods 27 of the handles 26. When the meat racks are in position on the unit, the bottoms of the handles 26 are disposed adjacent to the top of the upright portion 11.

In order to provide accurate and equal spacing of the meat from the heat, the upright portion 11 is provided on the inside of each end thereof with parallel inwardly inclined guide means which cause the meat holding racks to move downwardly and inwardly by the force of gravity into engagement with the grates 16 to provide contact cooking without flare-up.

The guide means comprise a pair of upper guide members 30 which are mounted on the inside of each end of the upright portion 11 adjacent to the upper end thereof. Each of the upper guide members 30 has a pair of downwardly and inwardly inclined portions 31 adjacent its opposite ends, adjacent the outer ends of which are vertically directed lips 33. A pair of identically formed lower guide members 30 are mounted on the inside of each end of the upright portion 11 adjacent to the lower end thereof.

There are accordingly four inclined portions 31 disposed adjacent to the four corners of each side of the upright portion 11. The upper and lower inclined portions on each side of the upright portion are aligned with those on the other side. The upper inclined portions 31 are parallel with the lower inclined portions 31.

One side of each of the meat racks 22 is provided adjacent its upper and lower ends with a pair of outwardly extending pins 32. When the racks 22 are mounted on the upright portion 11, these pins 32 engage the inwardly and downwardly slanted portions 31 of the guides 30 to guide the inner sides of the racks 22 to a position directly adjacent to the grates 16.

The force of gravity cause the racks 22 to move downwardly and inwardly as far as possible. In addition to moving the meat racks into engagement with the heat source, the guide means provide uniformity and correct spacing of the meat from the heat source. It makes no difference which side of the rack is disposed inwardly toward the grate 16, since the slanted portions 31 of the guides 30 are at least equal in length to the maximum possible spacing between the sides of the rack 22.

The lips 33 on the outer ends of the guide members 30 prevent the pins 32 from accidentally slipping off the inclined portions 31. They make it necessary for the racks 22 to be moved around them whenever the racks are mounted on or removed from the upright portion 11.

I claim:
1. A portable vertical barbecue unit comprising a base, an upright portion extending vertically upwardly from said base, vertically directed heating means disposed within said upright portion and extending across substantially the entire width thereof, a plurality of chunks of heat refractory material forming a pair of vertically directed layers covering both sides of said heating means, and a pair of vertically directed meat racks removably mounted on opposite sides of said upright portion directly adjacent to said heat refractory material.

2. The structure described in claim 1, and a plurality of inclined meat rack guiding members carried by said upright portion, said meat racks being slidably mounted on said guiding members so that said racks are automatically moved inwardly into engagement with the heating area of said unit.

3. The structure described in claim 2, said guiding members comprising four aligned and parallel inclined guiding members disposed adjacent to the corners of each side of said upright portion.

4. The structure described in claim 3, each of said meat racks having four outwardly directed pins disposed adjacent to its four corners, said pins adapted to be slidably mounted on said inwardly inclined guiding members.

5. The structure described in claim 2, and grease collecting means comprising a pair of elongated horizontally directed grease basins disposed beneath said meat racks.

6. The structure described in claim 5, and a grease catching tray disposed beneath each of said grease basins and being slidably mounted within said base, the bottoms of said basins having a plurality of openings leading into said grease trays.

7. The structure described in claim 2, each of said meat racks having a handle connected to said meat rack by a short rod, the top of said upright portion having adjacent the midportion thereof a pair of inwardly aligned transverse slots, said rods adapted to be mounted in said slots when said racks are mounted on said upright portion.

8. The structure described in claim 1, and a pair of vertically extending grates disposed on opposite sides of said heating means to hold said heat refractory material adjacent to said heating means.

References Cited

UNITED STATES PATENTS

| | | | |
|---|---|---|---|
| 1,455,190 | 5/1923 | Dodge | 99—396 |
| 1,903,324 | 4/1933 | Codling | 99—392 |
| 2,774,345 | 12/1956 | Peplin | 99—393 XR |
| 3,052,177 | 9/1962 | Lombardo | 99—400 XR |
| 3,220,335 | 11/1965 | Rodrigue | 99—400 XR |

BILLY J. WILHITE, Primary Examiner

U.S. Cl. X.R.

99—400, 402, 446, 448; 219—341, 399